United States Patent [19]

Matsuo

[11] Patent Number: 4,736,780
[45] Date of Patent: Apr. 12, 1988

[54] SOLDER FEEDING SYSTEM

[75] Inventor: Jinsuke Matsuo, Tokyo, Japan

[73] Assignee: Matso Solder Manufacturing Co., Ltd., Tokyo, Japan

[21] Appl. No.: 744,572

[22] Filed: Jun. 14, 1985

Related U.S. Application Data

[63] Continuation-in-part of Ser. No. 454,625, Dec. 30, 1982, abandoned.

[30] Foreign Application Priority Data

Jan. 22, 1982 [JP] Japan .................................. 57-7539

[51] Int. Cl.⁴ .............................................. B65B 57/00
[52] U.S. Cl. ........................................ 141/82; 141/95; 141/98; 414/160; 414/189; 222/56; 221/12; 221/301
[58] Field of Search ...................... 141/82, 94, 95, 192, 141/198, 98; 414/160, 161, 189; 126/274, 240; 222/56; 221/9, 10, 12, 301, 175, 298; 198/505, 954

[56] References Cited

U.S. PATENT DOCUMENTS

| | | | |
|---|---|---|---|
| 1,631,014 | 5/1927 | Cox ..................................... | 414/161 |
| 1,822,336 | 9/1931 | Burns .................................. | 221/10 |
| 1,961,893 | 6/1934 | Wadman et al. ..................... | 414/161 |
| 2,216,853 | 10/1940 | Middleton ........................... | 221/298 |
| 2,369,305 | 2/1945 | Lobasso ........................... | 221/298 X |
| 2,525,261 | 10/1950 | Henderson ....................... | 221/175 X |
| 2,635,579 | 4/1953 | Chadsey, Jr. .................... | 414/160 X |
| 2,711,321 | 6/1955 | McGraw, Jr. ...................... | 221/298 |
| 3,215,241 | 11/1965 | Haefele et al. ..................... | 221/298 |
| 3,246,799 | 4/1966 | Davis ............................... | 221/298 X |
| 3,360,096 | 12/1967 | Moore et al. .................... | 221/298 X |
| 3,938,654 | 2/1976 | Mohr ................................. | 198/287 |
| 4,405,059 | 9/1983 | Kull ................................... | 221/129 |

FOREIGN PATENT DOCUMENTS 2425381  1/1980  France ................................. 141/95

Primary Examiner—Henry J. Recla
Assistant Examiner—Ernest G. Cusick
Attorney, Agent, or Firm—Birch, Stewart, Kolasch & Birch

[57] ABSTRACT

A solder feeding system including an apparatus for supplying a predetermined number of solder balls to at least one soldering bath once the level of liquid solder in the bath drops below a defined limit. The solder ball is shaped to have a diameter of from 5 mm to 50 mm, preferably 10 mm to 30 mm by casting, forging, or rolling. The number of solder balls added have a volume capable of raising the level of liquid solder in the bath by a distance similar to or less than a range of tolerable upper and lower limits and a thermal capacity to lower the temperature of the liquid solder within a tolerable range.

5 Claims, 4 Drawing Sheets

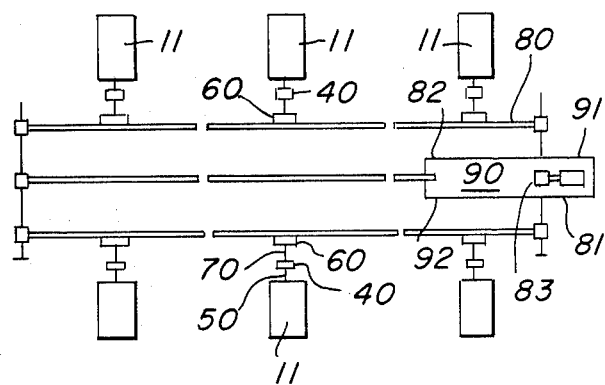
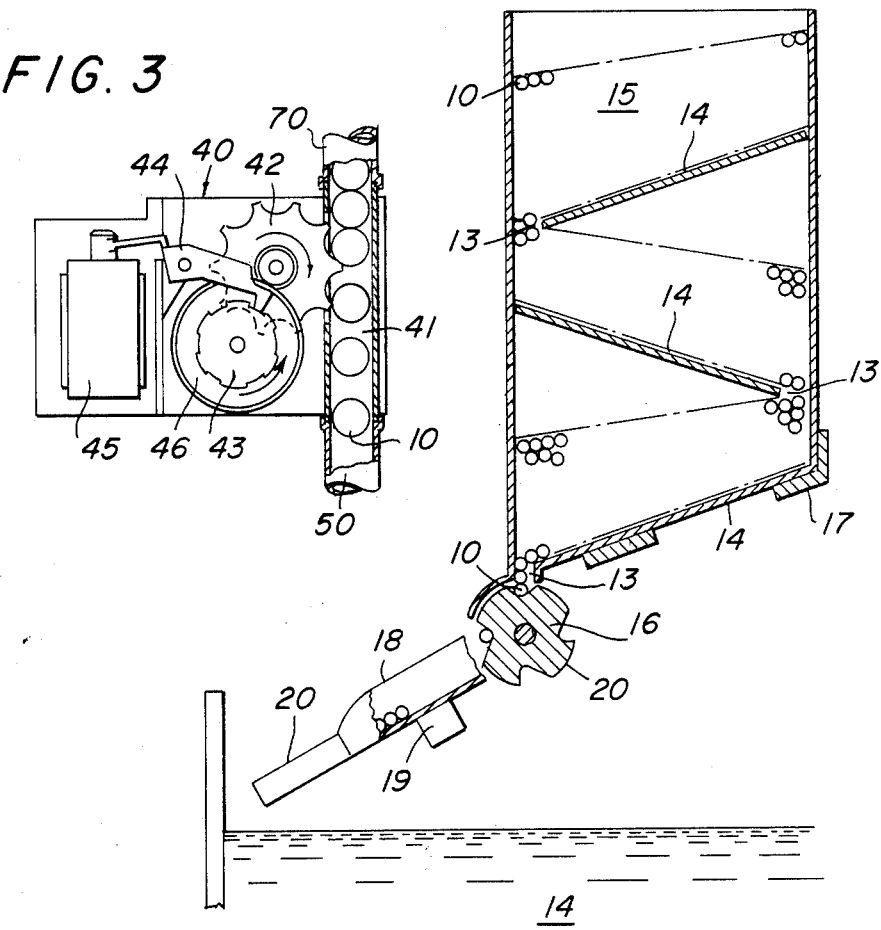

SOLDER FEEDING SYSTEM

This is a continuation-in-part of application Ser. No. 454,625, filed Dec. 30, 1982, now abandoned.

BACKGROUND OF THE INVENTION

This invention relates to a solder feeding system of the type whereby pieces of solder are supplied to a soldering bath to maintain the level of the liquid solder in the bath.

A solder feeding system is required to automatically supply the same amount of solder as consumed for soldering to a bath in which articles, such as printed circuit boards, are successively soldered by the liquid solder. The liquid solder level should be prevented from fluctuating out of a tolerable range. For example, the fluctuation of the liquid solder level is desirably maintained within a range of −0.3 mm to +0.3 mm, to achieve precise soldering of finely printed circuit boards. The system is also needed to supply solder without bringing about a sudden temperature-drop in the soldering bath to avoid deterioration in soldering quality. As disclosed in Japanese Patent Publication (Tokyo Koho Sho, No. 55-19173), a known system comprises a solder bar of about 4 cm×5 cm×50 cm suspended by a belt and a pulley rotated by a motor to drive the belt, whereby the motor is rotated in one direction to dip the solder bar in the soldering bath when the liquid solder level drops below a preselected lower limit and is reversed to pull up the solder bar from the bath when the solder level exceeds a predetermined upper limit. However, for use with the soldering bath in which finely printed circuit boards are soldered, the solder bar is not only too large in size to reduce the fluctuation of the liquid solder level within a desirable range but also it is too large in thermal capacity to prevent the temperature of the liquid solder from suddenly dropping below an allowable limit. Besides, the solder bar is heavy and somewhat inconvenient to handle.

It is an object of the invention to provide a solder feeding system having such pieces of solder that are suitable for use with a soldering bath in which finely printed circuit boards are soldered.

It is another object of the invention to provide a solder feeding system having such pieces of solder that are supplied to a soldering bath without fluctuating the liquid solder level beyond a tolerable limit.

It is a further object of the invention to provide a solder feeding system having such pieces of solder that are supplied to a soldering bath without lowering the temperature of liquid solder in the bath below a tolerable limit.

The feeding system of the present invention comprises solder balls in the form of pinballs having a diameter of from 5 mm to 50 mm, preferably 10 mm to 30 mm, and an apparatus for automatically feeding a certain number of the solder balls to a soldering bath when the liquid solder level drops below a preselected limit, the number of solder balls being determined so as to raise the level of molten solder in the bath by an amount which keeps the level at or slightly less than the allowable range of fluctuation.

The solder ball is manufactured by various methods. An ingot of solder alloy is made molten and poured into a mold forming a plurality of spherical hollows to produce solder balls. A solder wire is shaped to the solder balls of a diameter slightly larger than that of the solder wire by cold or hot forging. Otherwise, the solder wire is continuously converted to the balls by cold or hot rolling. In general, the casted ball needs no additional working process to improve its rollability.

The feeding apparatus comprises a hopper disposed over a soldering bath for storing and arranging the solder balls in a plurality of lines, a discharge means mounted in the hopper for adding a preselected number of the solder balls into the soldering bath from the hopper, and a level control means for detecting the liquid solder level in the soldering bath and actuating the discharge means. The number of solder balls added each time from the discharge means is adjusted to raise the liquid solder level in the bath by a height less than a distance between the preselected upper and lower limits, for example, 0.6 mm of −0.3 mm to +0.3 mm. The narrow distance between the upper and lower limits reduces the number or amount of solder balls to be added at one time to the soldering bath such that due to the low thermal capacity of the solder balls a sudden temperature drop below a tolerable limit in the bath does not occur.

The advantages offered by the present invention are mainly that the level and the temperature of the liquid solder in the soldering bath can be kept substantially constant while the solder balls are supplied to the bath. Solder balls are easy to handle and are automatically supplied not only to a single bath but also to a plurality of baths, even if every bath differs from the other in capacity or operation. All in all, articles such as finely printed circuit boards can be uniformly soldered in the soldering bath.

The above and other objects and advantages of the invention will become more apparent from the following description and accompanying drawings forming part of the invention.

BRIEF DESCRIPTION OF DRAWING

Preferred embodiments of the invention are described in detail below with reference to the drawings in which:

FIG. 2 is a schematic plan view of the embodiment of FIG. 1;

FIG. 3 is a cross-sectional view of the discharge means of the embodiment of FIG. 1;

FIGS. 4 and 5 are side elevational views partly in section of the hopper of another embodiment;

DETAILED DESCRIPTION

Figure 1:
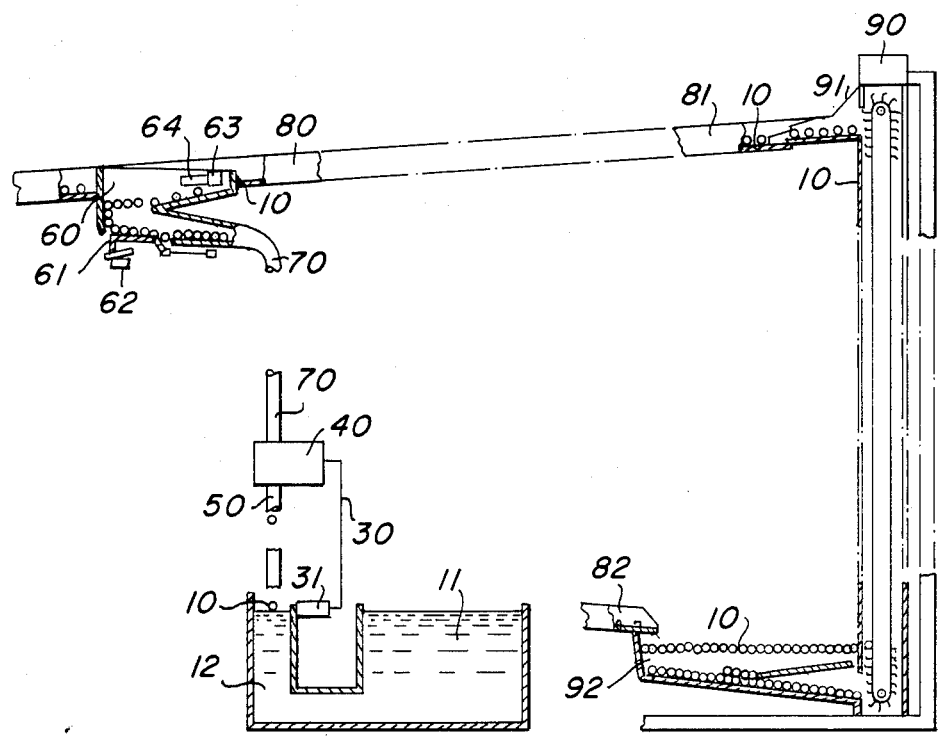
FIG. 1 is a side elevational view, partly in cross section, of an embodiment in which solder balls are fed to a plurality of soldering baths.

The system of the present invention, as seen in FIGS. 1 and 2, is useful for supplying solder to a plurality of soldering baths 11. Solder balls 10 are supplied to a portion 12 of the bath 11, which is superficially separated from the other portion.

The solder ball 10 has a diameter of from 10 mm to 30 mm, for example 20 mm. A storage box 92 is disposed on the floor and has a capacity for containing at least the number of solder balls 10 consumed daily in all of the baths 11. A conveyor 90 extends upright from the box 92 to a bridge 91, which is connected to the top portion 81 of a slanting trough 80. The trough 80 branches out at the junction 83 to a plurality of parts, which extend over and along the respective rows of the baths 11. The branched parts are again united to a single bottom portion 82, the end of which opens to the box 92. Each bath 11 is connected to the trough 80, with the intervention of a hopper 60, with a tubular passage 70 and a discharge 40 into a chute 50. The hopper 60 is joined to the trough 80 through an inlet 63, the gate 64 of which is controlled by a switch 62. The hopper 60 has a weigh-pan 61, at its bottom, for engagement with the switch 62 to open and close the gate 64. The tubular passage 70 forms the outlet of the hopper 60 connected to the discharger 40. The chute 50 extends from the discharger 40 toward the portion 12 of the bath 11. A control device 30 has a level meter 31 mounted in the portion 12 and wired to the discharger 40.

In operation, the solder balls are successively raised up to the bridge 91 from the box 92 by the conveyor 90 and roll down from the bridge 91 along the slanting trough 80. Meanwhile, the balls 10 enter one of the hoppers 60 having the gate 64 open and pass through the hopper 60 to the tubular passage 70, when the respective tube is vacant. The solder balls 10 line up in the tube and pile up on the weigh-pan 61 after the tubular passage 70 is packed with the balls. When the weight of the balls 10 on the weigh-pan 61 exceeds a preselected weight, it abuts and turns on the switch 62 so as to shut the gate 64 of the inlet 63.

If none of the gates 64 open, the balls 10 roll down along the branched trough 80 and return to the box 92 from the bottom portion 82, to be taken up again by the conveyor 90.

As seen in FIG. 3, the discharger 40 has a conduit 41 interposed between the chute 50 and the tubular passage 70. The conduit 41 has an inner diameter slightly larger than the outer diameter of a solder ball 10 and an opening into which a star wheel 42 partly enters. The star wheel 42 is coaxially fixed to a driven gear 47, which is in mesh with a drive gear 46. The gear 46 is coaxially fixed to a ratchet 44, which is actuated by a solenoid 45. The solenoid is energized when the level meter detects that the liquid solder level has dropped below a preselected limit. Every actuation of the solenoid 45 causes the star wheel 42 to rotate and discharge a predetermined number of solder balls 10 to the soldering bath from the conduit 41 through the chute 50. The number of solder balls 10 added upon energization of the solenoid 45 can be adjusted by replacement of the drive and driven gears 46 and 47 in a manner that the amount of molten solder added corresponding to the number of solder balls 10 necessary to raise the liquid solder level by a height less than a distance between tolerable upper and lower limits, for example, 0.6 mm of −0.3 mm to +0.3 mm. The amount of solder supplied to the bath each time is so small as not to drop the temperature of liquid solder in the bath below an allowable limit. The solder balls are automatically supplied to all of the baths to maintain both the level and the temperature of the liquid solder in the respective baths within a range required for uniform soldering of finely printed boards.

Figure 5:
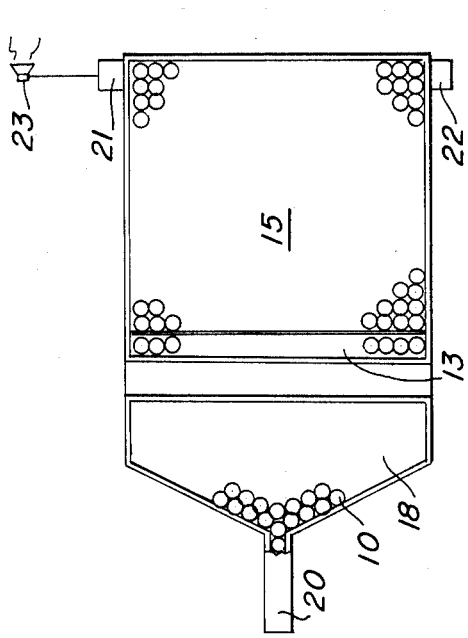

The embodiments as seen in FIGS. 4 to 10 individually used for the respective soldering baths. The box-type hopper 15 of FIGS. 4 and 5 is mounted on the frame 17 over an individual bath 11. The hopper 15 is vertically separated by shelves 14 which are alternatively inclined in opposite directions to each other. Each shelf 14 is formed at the bottom and with a slit 13, through which a line of balls 10 drop down. The lowest shelf 14 has its slit 13 connected to a discharger 40. The hopper 15 includes a detector consisting of a lamp 22, a photoelectric device 21 and a buzzer 23 wired to the photoelectric device to sound a warning signal when the balls 10 decrease in number to a preselected limit, as shown in FIG. 5. The photoelectric device can be replaced by a weighing device. The discharger 40 includes a star wheel 16 disposed under the lowest slit 13 to receive a line of solder balls 10, and is followed by a chute 18 with a diameter slightly larger than that of the solder ball 10. A non-illustrated level meter is mounted in the bath 11 to watch the liquid solder level and wired to a non-illustrated electric motor for driving the star wheel 16. The star wheel 16 is partly rotated by the motor to discharge a predetermined number of solder balls 10 to the chute 18 when the level meter detects the liquid solder level has dropped below a preselected limit. The chute 18 is shaken by a vibrator 19 to drop the balls 10 smoothly through the pipe 20.

Figure 7:
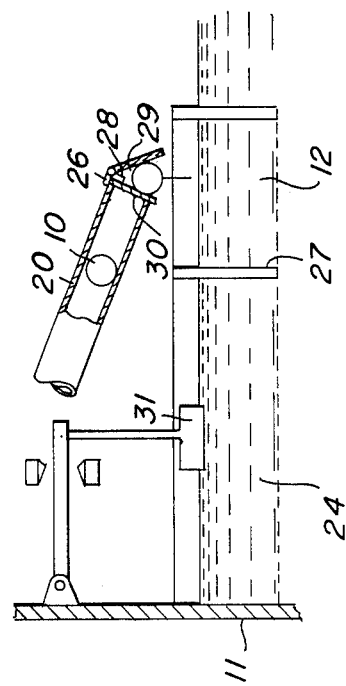
FIGS. 6 and 7 are enlarged side elevational views relating to the discharge of the solder balls, illustrating the solder ball decelerated by a damper.
Figure 6:
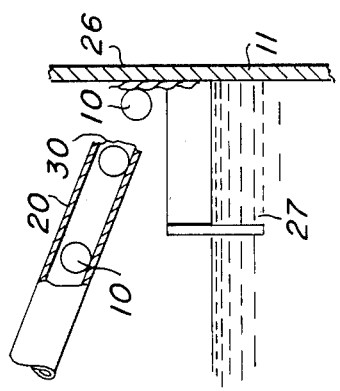

As seen in FIGS. 6 and 7, the solder ball 10 drops from the end 30 of the pipe 20 positioned close to and above the surface of portion 12 of the bath 11, which is enclosed by a vertical board 27 and superficially separated from the remaining portion of the bath 11 where soldering is performed, for the purpose of intercepting any disturbance created due to the dropping of the solder balls. The solder ball 10 dashes against a buffer-type damper 26 fixed to the wall of the bath 11 or a door-type damper 29 biased by a spring 28 at the pipe end 30 to lose most of its kinetic energy prior to dropping into the portion 12 to create a minimal head. Thus, the ripple caused by dropping a solder ball 10 into the bath 11 is too small to pass beyond the vertical board 27. It is desirable for a float-type level meter 31 to float on the surface of portion 24 superficially separated from the portions of the bath 11 into which the solder balls are dropped to measure the level of liquid solder without being influenced by the liquid flowing from the portion 12, as shown in FIG. 7.

Figure 9:
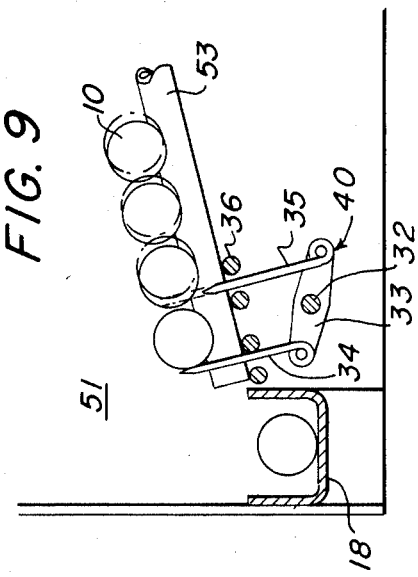
FIG. 9 is an enlarged section of the discharge means of FIG. 8.
Figure 8:
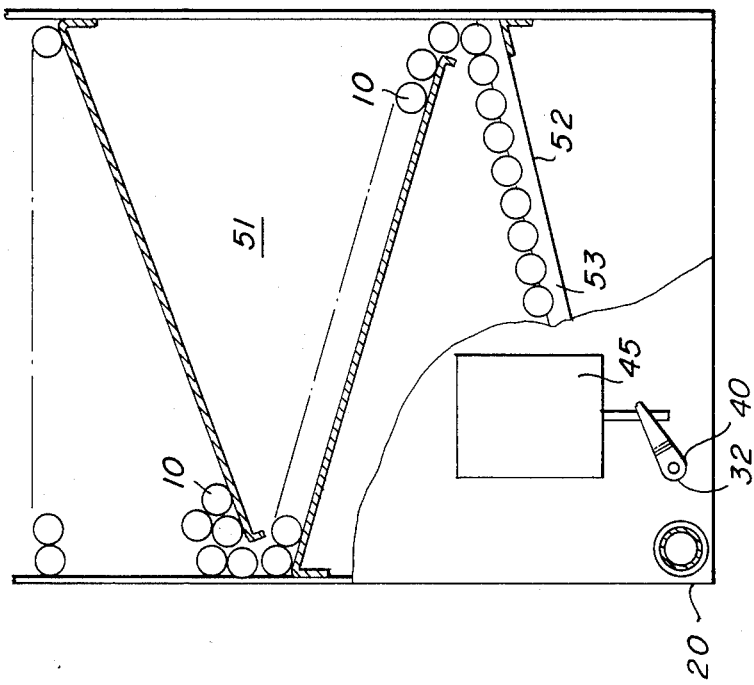
FIG. 8 is a side elevational view, partly in section, of the hopper of a further embodiment.

As seen in FIGS. 8 and 9, the hopper 51 has lower shelf 52 made of round bars 53 to form a multiplicity of channels or paths on which the solder balls 10 stand. The bars 53 have diameters less than that of the solder balls 10 and are uniformly spaced from each other at a distance slightly less than the diameter of the solder balls 10 and gradually incline to prevent the solder balls 10 thereon from piling up one above the other. A solenoid 45 is mounted on the side wall of the hopper 51 to drive the discharger 40, which includes a shaft 32 to be partly rotated by the solenoid 45, a blade 33 fixed to the shaft 32 for rotation therewith, front and rear stoppers 34 and 35 (FIG. 9) rotatably connected to the opposite ends of the blade 33, and guide rods 36 secured to the underside of the round bars 53. The solenoid rotates the blade 33 from a first position in which the front stopper 34 progects upward to prevent the endmost solder ball 10 from dropping into the chute 18 and the rear stopper 35 lowered, as the front stopper 34 sinks to permit the endmost solder ball 10 to drop into the chute 18 and the rear stopper 35 rises to prevent the succeeding ball from rushing out, as shown by dotted lines. In operation, when a non-illustrated level meter detects that the liquid solder level in the bath is dropping below a preselected limit, it energizes the solenoid to rotate the blade 33 on the shaft 32 and discharge a line or definite number of solder balls to the chute 18, as seen in FIG. 9. Therefore, the ball is drawn outwardly through a pipe 20 from the hopper 51 as seen in FIG. 8.

Figure 10:
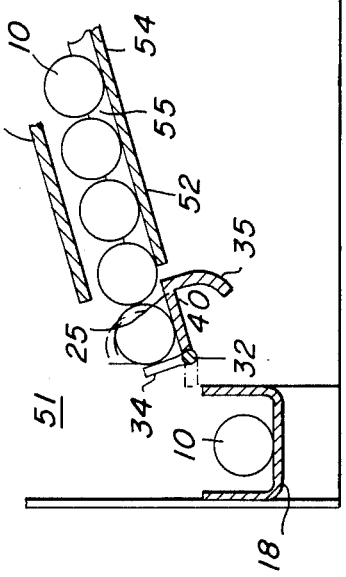
FIG. 10 is a view, similar to FIG. 9, of a further embodiment.

In the system according to FIG. 10, the hopper 51 has a lower shelf 52 made of a flat plate 54 with fins 55 to form individual channels or passageways. The fins 55 are spaced apart a distance slightly greater than the diameter of the solder balls 10 to arrange the solder balls 10 in the number of paths on the plate 54. The hopper 51 has a ceiling 56 disposed above the front end of the lower shelf 52. The clearance between the plate 54 and the ceiling 56 is slightly larger than the diameter of the solder balls 10. The discharger 40, following the front end of the lower shelf 52, includes a shaft 32, a hook-shaped blade 25 fixed to the shaft, and a non-illustrated solenoid mounted on the side wall of the hopper 51 to reciprocally turn the blade 25 one-fourth revolution. The blade 25 is provided with front and rear hook-shaped stoppers 64 and 65 to turn together with the shaft 32 from a first angular position in which the front slanting blade 25 from rolling down to the chute 18, as shown by solid lines, to a second angular position in which the front stopper 64 permits the foremost balls 10 to roll down the chute 18, but the rear stopper 65 prohibits the succeeding solder balls 10 from moving to the blade 25 in cooperation with the ceiling 56, as shown by dotted lines. When a non-illustrated level meter detects the liquid solder level is dropping below a preselected limit, it energizes the solenoid to reciprocate the shaft 32 one fourth rotation, so that the foremost solder ball 10 of each line on the lower plate 54 is discharged through the chute 18 to the soldering bath under the hopper 51. The number of solder balls 10 discharged to the bath upon actuation of the discharger 40 is similar to that of the solder ball lines on the lower shelf 52 and has a volume to raise the liquid solder level by a height required to maintain the level within a tolerable range of −0.3 mm to +0.3 mm in reference to a predetermined level.

Thus, the liquid solder level in the soldering bath fluctuates within a tolerable range with the result that the finely printed circuit boards are uniformly soldered. The amount of solder balls discharged each time is in thermal capacity too small to drop the temperature of the liquid solder below a tolerable limit, resulting in no deterioration in soldering quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A solder feeding system comprising solder balls having a preselected diameter and an apparatus for supplying said solder balls to at least one liquid solder bath having a predetermined level so as to maintain the level of said liquid solder in said bath with a predetermined range during soldering, said apparatus comprising storing means for storing said solder balls, discharger means juxtapositioned to said storing means for discharging said balls through a chute into said at least one solder bath, control means having a level meter mounted in said solder bath and an actuator connected to said level meter to actuate said discharger means, said storing means comprising at least one hopper disposed above said at least one solder bath and being vertically divided by a plurality of shelves of which a lowermost one comprises a series of separators to arrange said solder balls in a plurality of paths, said actuator being caused to drive said discharger means to incrementally discharge said solder balls from said hopper to said at least one solder bath when said level meter detects that the level of said liquid solder has fallen below said predetermined level, said chute having a tubular end extending to a position close to and just above said level of said liquid solder so as entry of said balls into said at least one solder bath does not disturb said level of said liquid solder bath and avoids creating substantial waves in the liquid solder bath which would interfere with operation of the level meter.

2. A solder feeding system as in claim 1, wherein said separators comprise a plurality of round bars uniformly spaced from each other at a distance slightly less than the diameter of said respective solder balls to form said respective paths, each of said round bars having a diameter less than said solder ball, the number of round bars being one more than the number of rows of balls.

3. A solder feeding system as in claim 2, wherein said discharger means comprises a shaft rotatably mounted in said hopper having a blade centrally fixed to said shaft and provided with front and rear stoppers, said shaft being reciprocally rotatable from angular positions in which said front stopper rises to a first position to prevent a foremost solder ball of each path on said lowermost shelf from rolling down to said chute while said rear stopper lies under said lowermost shelf, to a second position in which said front stopper is lowered to permit said foremost solder ball of each path on said lowermost shelf to roll down to said chute while said rear stopper rises to prevent the succeeding solder balls of each line from rolling down to said chute.

4. A solder feeding system as in claim 1, wherein said lowermost shelf is formed at a bottom end of said hopper with a slit having a width slightly larger than the diameter of said solder ball connecting to said chute into which said solder balls pass.

5. A solder feeding system as in claim 1, wherein said solder bath is provided with a vertical board which encloses and divides a first portion of said solder bath into which said solder ball is discharged from a second portion of said bath in which said level meter to detect the level of said liquid solder is placed.

* * * * *